(12) United States Patent
Böhme et al.

(10) Patent No.: US 7,762,703 B2
(45) Date of Patent: Jul. 27, 2010

(54) HEADS-UP DISPLAY, MOTOR VEHICLE AND METHOD OF OPERATING A HEADS-UP DISPLAY

(75) Inventors: Aiko Böhme, Ingelheim (DE); Peter Brandt, Aschaffenburg (DE); Heiko Charle, Rüsselsheim (DE)

(73) Assignee: GM Global Technology Operations, Inc., Detroit, MI (US)

( * ) Notice: Subject to any disclaimer, the term of this patent is extended or adjusted under 35 U.S.C. 154(b) by 242 days.

(21) Appl. No.: 11/681,422

(22) Filed: Mar. 2, 2007

(65) Prior Publication Data
US 2007/0274102 A1    Nov. 29, 2007

(30) Foreign Application Priority Data
Mar. 29, 2006    (DE) ................. 10 2006 014 394

(51) Int. Cl.
*A47F 3/00* (2006.01)
(52) U.S. Cl. ............... 362/561; 362/615; 362/624; 362/622; 362/616; 362/612; 362/611; 362/608; 345/7; 359/631; 359/630; 359/632; 359/629; 359/34
(58) Field of Classification Search ........ 362/561, 362/615, 624, 622, 459, 471, 489, 616, 612, 362/611, 608
See application file for complete search history.

(56) References Cited

U.S. PATENT DOCUMENTS

| | | | |
|---|---|---|---|
| 5,063,379 A | 11/1991 | Fabry et al. | |
| 5,963,280 A * | 10/1999 | Okuda et al. | 349/65 |
| 6,486,856 B1 | 11/2002 | Zink | |
| 6,646,810 B2 * | 11/2003 | Harter et al. | 359/630 |
| 7,034,778 B1 | 4/2006 | Hähl | |
| 7,413,328 B2 * | 8/2008 | Dubin et al. | 362/471 |

FOREIGN PATENT DOCUMENTS

DE    1804063    6/1969

(Continued)

OTHER PUBLICATIONS

European Patent Office, European Search Report for European Application No. 07006337.5, Jul. 27, 2007.

*Primary Examiner*—Sandra L O'Shea
*Assistant Examiner*—Jessica L McMillan
(74) *Attorney, Agent, or Firm*—Ingrassia Fisher & Lorenz, P.C.

(57) ABSTRACT

A heads-up display comprises a monochrome display device for generating an image and an optical device for generating a virtual image from the image of the display device. The monochrome display device comprises a display and a backlight for illuminating the display from its backside. The backlight comprises a first light source emitting light of a first color, a second light source emitting light of a second color, a first light guide coupled to the first light source, and a second light guide coupled to the second light source. The first and second light guides are disposed in such close juxtaposition behind the display so that they illuminate together the entire backside of the display and illuminate a first region of the display associated with the first light guide with the first color and a second region of the display associated with the second light guide with the second color.

22 Claims, 4 Drawing Sheets

FOREIGN PATENT DOCUMENTS

| | | |
|---|---|---|
| DE | 3301914 | 7/1984 |
| DE | 3512099 | 10/1986 |
| DE | 4203014 | 8/1992 |
| DE | 20319732 U1 | 5/2004 |
| DE | 102004007802 A1 | 9/2005 |
| EP | 0157958 | 10/1985 |
| EP | 0415275 | 3/1991 |
| EP | 0570037 | 11/1993 |
| EP | 0570037 A1 | 11/1993 |
| EP | 0707408 A1 | 4/1996 |
| EP | 1152186 | 11/2001 |
| EP | 1413470 A1 | 4/2004 |
| EP | 1519214 | 3/2005 |
| WO | 2005045793 A1 | 5/2005 |

* cited by examiner

HEADS-UP DISPLAY, MOTOR VEHICLE AND METHOD OF OPERATING A HEADS-UP DISPLAY

CROSS-REFERENCE TO RELATED APPLICATION

This Utility Patent Application claims priority to German Patent Application No. DE 10 2006 014394.9, filed Mar. 29, 2006.

FIELD OF THE INVENTION

The invention relates to a heads-up display, to a motor vehicle and to a method of operating a heads-up display.

BACKGROUND OF THE INVENTION

What is known as a heads-up display (HUD) is a display system in which information is projected into the field of vision of a user, for example the driver of a car or the pilot of an airplane. Pilots have had such systems since the 1940s, when they were known as reflex visors.

A heads-up display generally comprises a display device and an optical device which cooperate with what is known as a combiner. The display device generates an image from which the optical device, comprising for example a lens and a concave mirror, generates a virtual image which the driver or pilot views in a reflective, transparent screen: the combiner. The combiner therefore superimposes on the virtual image the environmental information appearing through the combiner.

If a heads-up display is installed in a motor vehicle, the windscreen of the motor vehicle may be used as the combiner.

For relatively good readability of the virtual image, the display device should generate not only a sufficiently bright image but also, if possible, a color image.

Published European application for patent EP 1 143 288 A1 discloses a heads-up display in which the light from a light source is transmitted through a liquid crystal display (LCD) screen and the image which may be seen on the liquid crystal display screen is projected on the windscreen of a motor vehicle as a virtual image. The light source comprises a plurality of red, blue and green light-emitting diodes disposed on a common carrier.

Published European application for patent EP 0 570 037 A1 discloses a further heads-up display comprising a monochrome or a polychrome display device.

BRIEF SUMMARY OF THE INVENTION

According to the invention, a heads-up display comprises a monochrome display device for generating an image and comprising an optical device for generating a virtual image from the image of the display device, wherein the monochrome display device comprises a display and background lighting provided for backlighting the display and the background lighting comprises a first light source emitting light of a first color, a second light source emitting light of a second color, a first light guide coupled to the first light source and a second light guide coupled to the second light source, wherein the two light guides are disposed in such close juxtaposition behind the display of the display device that they backlight the entire area of the display and backlight a region of the display associated with the first light guide with the first color and a region of the display associated with the second light guide with the second color. This allows the two regions to be backlit with different colors and at the same time the entire area of the display to be backlit without the means for lighting the two regions affecting one another or, if they do affect one another, then doing so only slightly. The prerequisites for generating a multicolored image using the monochrome display device, which is relatively inexpensive to produce, are thus met and this is, in turn, a prerequisite for generating a multicolored virtual image. The term "image" or "projected image" refers to any type of displayed information, i.e. including numbers, letters or symbols.

According to an embodiment of the inventive heads-up display, the risk of the two regions affecting one another may be reduced if the two light guides are separated from one another by a non-transparent and/or light-reflecting layer. The layer is, for example, a thin film or may preferably be applied by means of color printing.

The two colors may be different, identical and/or adjustable.

If the display used is a liquid crystal display screen in an embodiment of the inventive heads-up display, then the heads-up display may be produced particularly inexpensively.

The inventive heads-up display may be configured in a particularly attractive manner if, according to a variation, at least one of the two light guides takes the form of a symbol. A symbol of this type is, for example, a trade mark.

The inventive heads-up display may, in particular, be used in a motor vehicle, for example as an instrument cluster for displaying various vehicle parameters. When used in a motor vehicle, the inventive heads-up display may be used, in particular, for carrying out a method comprising the following method steps: injecting light of the first color into the first light guide and into the second light guide, which are juxtaposed in such a way behind the display of the display device that they backlight substantially the entire area of the display with the first color, and changing the color of the light injected into the second light guide from the first color to a second color differing from the first color on the basis of a signal emitted by a control device of the vehicle, so that a region of the display associated with the first light guide is backlit with the first color and a region of the display associated with the second light guide is backlit with the second color.

This method allows substantially the entire display initially to be backlit with the first color. If the control device emits the signal, the second color changes, i.e. the display is backlit with the second color in the region of the second light guide. However, owing to the two light guides, which are preferably isolated from one another by a non-transparent and/or light-reflecting layer, the second color does not disturb, or hardly disturbs, the region of the display that is backlit by the first light guide. The region of the display that is backlit by the second light guide is, for example, associated with a warning signal, so the control device emits the signal when a driver of the motor vehicle is to be warned. The region of the display that is backlit by the second light guide is then backlit with the second color, for example red.

The inventive heads-up display therefore provides, inter alia, a heads-up display comprising a backlit display device, the light of which is injected into the two light guides and is emitted therefrom behind the display, for example the glass of a liquid crystal display screen. The display comprises a plurality of lighting zones, each of which is backlit by one of the two light guides. The light guides are joined directly adjacent to one another. In order to rule out the risk of light transferring from one light guide to the other light guide, the thin, non-transparent or light-reflecting layer is inserted at the interface of the two light guides. This allows, in particular, the following use:

The entire display of the display device may be completely utilized with its conventional backlighting color. Light of a single color is therefore initially injected in the two light guides. The entire display is then substantially backlit with this color. If a warning display is to be presented, for example in the color red, then the associated symbol is generated in the region of the second light guide. Only in this region is the red backlighting, instead of the yellow backlighting, then activated by injecting a red light into the second light guide.

Since the interface between the two light guides may be relatively thin, the entire display of the display device is backlit uniformly substantially over its entire area if a light of a single color is injected in both light guides.

The invention also provides a heads-up display comprising a display device for generating an image and an optical device for generating a virtual image from the image of the display device, wherein the display device comprises a first light guide, a second light guide, a first light source that injects light of a first color into the first light guide and a second light source that injects light of a second color into the second light guide, wherein the two light guides are disposed in such close juxtaposition that they form substantially an area designed as a display area and are separated from one another by a non-transparent and/or light-reflecting layer. The light-absorbing or light-reflecting layer, which may preferably be a thin film or may be applied by means of color printing, on the one hand, prevents overlapping of two different-colored lights injected into the two light guides and, on the other hand, provides a visually continuous display surface which is not interrupted by any non-lighting demarcations.

Advantages of the inventive heads-up display include:

There are cost advantages owing to the use of a monochrome display device for a heads-up display for displaying color information. In comparison to conventional color display devices, the background lighting of the inventive heads-up display may be less powerful, since a monochrome display has relatively high transmission. This has a positive effect on the price of the light source used.

Owing to the relatively high transmission of the monochrome display, prerequisites for a relatively bright image, and therefore for a relatively bright virtual image, are met. Despite the use of the monochrome display, the light guide structure according to the invention produces a multicolored image.

Specific symbols, such as for example a warning symbol, circles or curves, may be fixed in the light guide structure. A relatively low-resolution monochrome display may thus be used and this, again, may reduce costs.

Relatively simple scaling of the color range of the heads-up display according to the invention is obtained.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
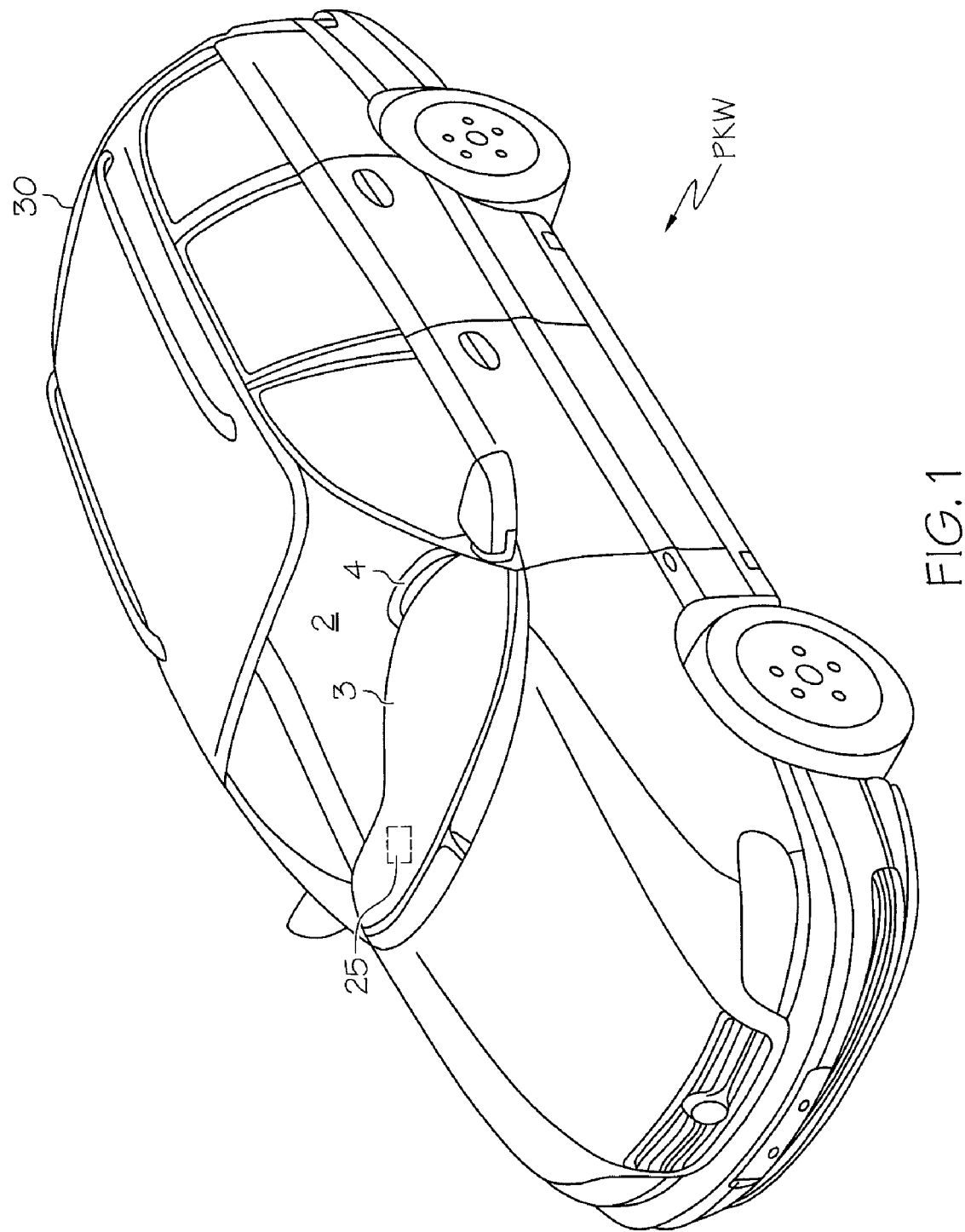
FIG. 1 is a passenger car.
Figure 3:
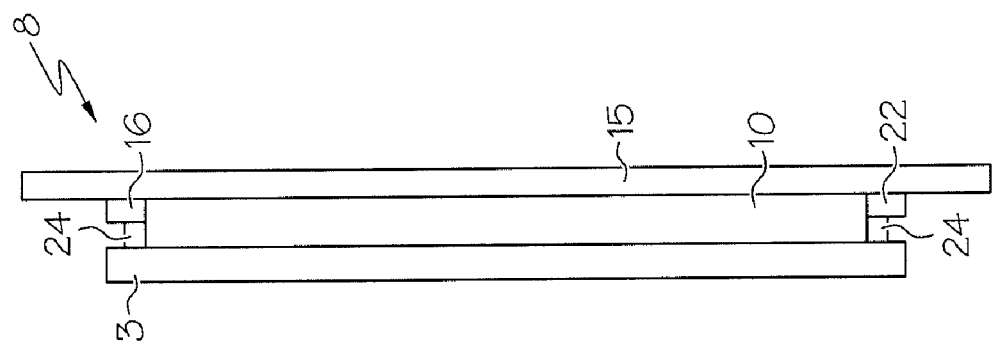
FIGS. 3, 4 are different views of the display device for the heads-up display of FIG. 2.
Figure 2:
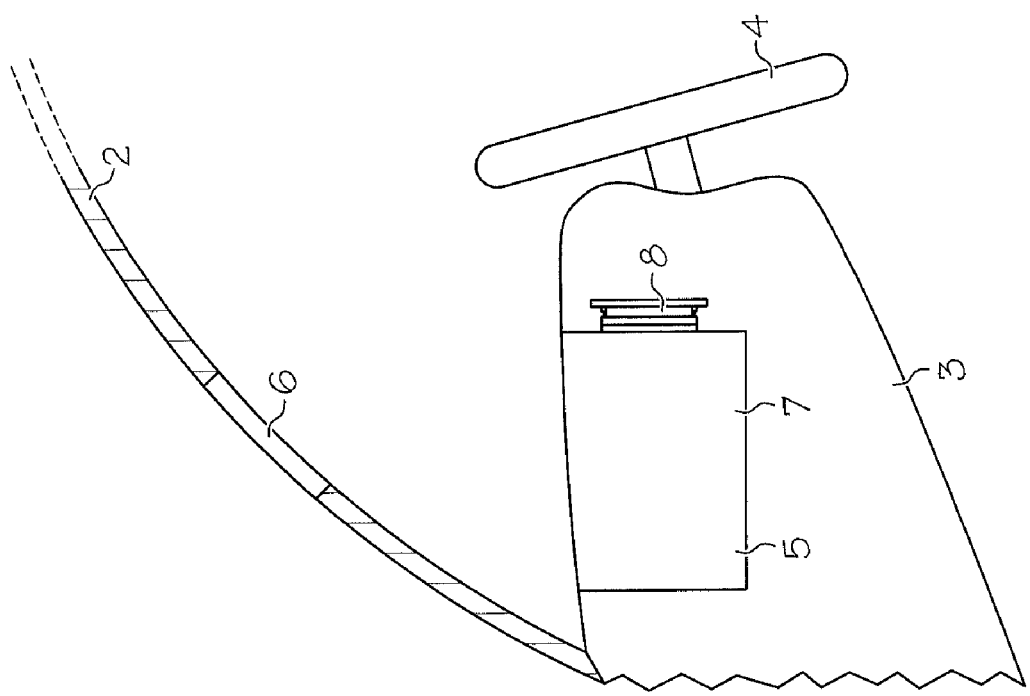
FIG. 2 is a portion of the passenger car of FIG. 1 having a heads-up display.
Figure 4:
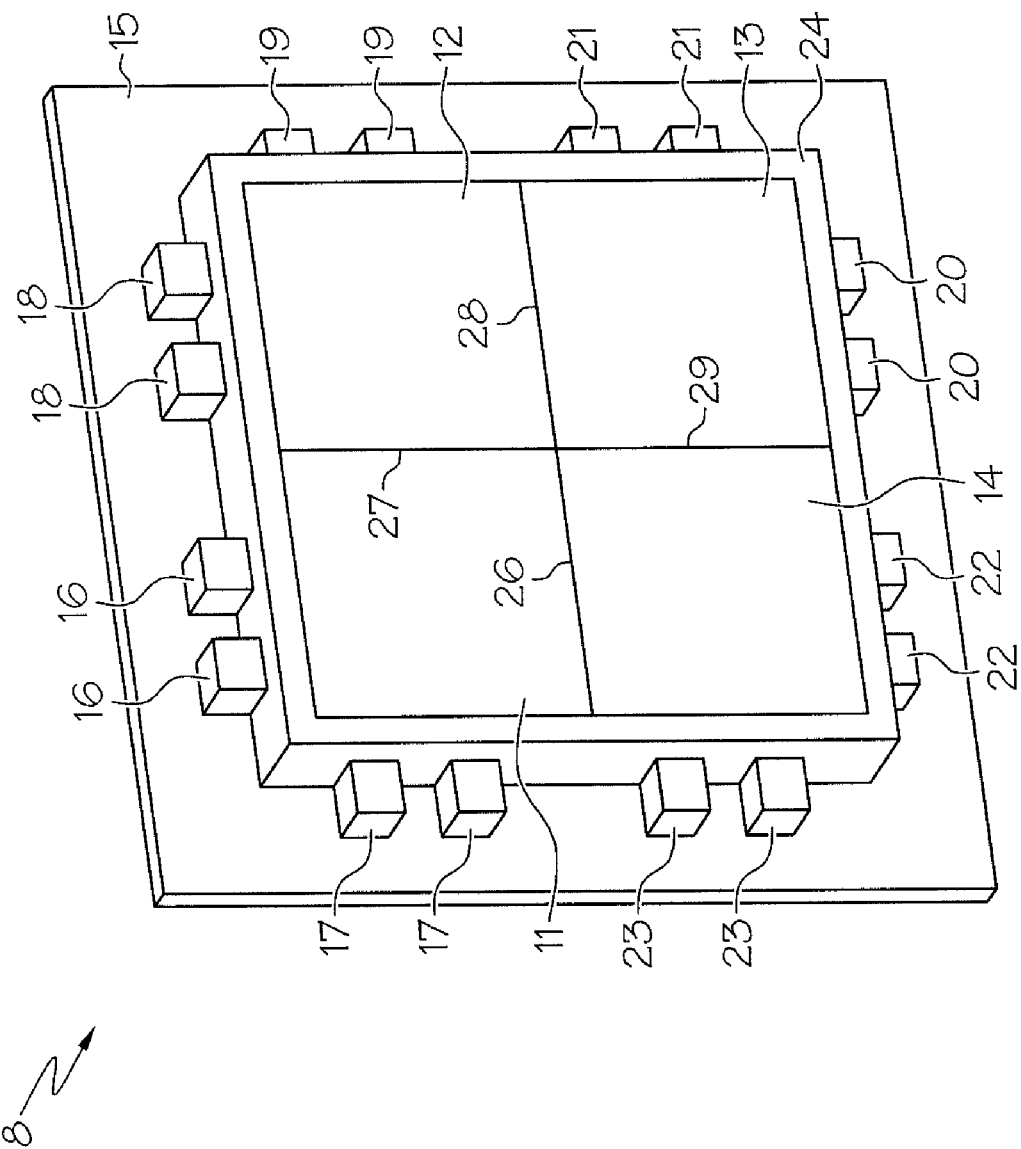

FIG. 1 shows a passenger car having a windscreen 2 and a dashboard 3 on which there is disposed a steering wheel 4 and to which, in the case of the present embodiment, a heads-up display 5, illustrated in greater detail in FIG. 2 to 4, is attached. The heads-up display 5 is provided to project an image in a projection region 6 of the windscreen 2.

The heads-up display 5 comprises an optical device 7 and a display device 8, illustrated in greater detail in FIG. 3 and 4, for generating an image. The image generated by the display device 8 is injected into the optical device 7 which then generates from the image of the display device 8 in a generally known manner, such as is known, for example, from published European application for patent EP 1 143 288 A1, a virtual image projected onto the projection region 6 of the windscreen 2. The optical device 7 comprises, for example, a lens and a concave mirror.

The projection region 6 is located in the field of vision of a driver (not illustrated in greater detail) of the passenger car, so the projection region 6 superimposes on the virtual image the environmental information appearing through the windscreen 2. In the case of the present embodiment, the heads-up display 5 is provided to inform the driver about vehicle parameters of the passenger car.

The display device 8 comprises, in the case of the present embodiment, a liquid crystal display screen 9 as the display and a background lighting means, disposed on the back of the liquid crystal display screen 9, for backlighting the liquid crystal display screen 9. The background lighting means has, in the case of the present embodiment, a light guide 10 made from plexiglass. The light guide 10 has, in the case of the present embodiment, four part light guides 11-14 which jointly extend over substantially the entire area of the back of the liquid crystal display screen 9.

The light guide 10 is disposed on a printed circuit board 15 having light-emitting diodes 16-23 which each inject light laterally into the light guide 10. In the case of the present embodiment, four respective light-emitting diodes, which emit light of different colors, are associated with each of the four part light guides 11-14. In the case of the present embodiment, yellow light-emitting diodes 16 and red light-emitting diodes 17 are disposed laterally on the first part light guide 13. Yellow light-emitting diodes 18 and green light-emitting diodes 19 are disposed laterally on the second part light guide 12. Yellow light-emitting diodes 20 and red light-emitting diodes 21 are disposed laterally on the third part light guide 13. Yellow light-emitting diodes 22 and green light-emitting diodes 23 are disposed laterally on the fourth part light guide 14.

The background lighting means further comprises a reflector 24 which laterally frames the light guide 10. In addition, the four part light guides 11-14 are isolated at those interfaces at which the part light guides 11-14 respectively make contact, by thin, non-transparent layers 26-29 which, in the case of the present embodiment, were applied to the first part light guide 11 and the third part light guide 13 by means of color printing.

The light-emitting diodes 16-23 are connected in a non-illustrated manner to a control device 25 which is disposed below the dashboard 3 of the passenger car and individually activates the light-emitting diodes 16-23. In the case of the present embodiment, the control device 25 may be used to adjust the intensity of the light issuing from the light-emitting diodes 16-23 or the light-emitting diodes 16-23 may be switched on and off.

In the case of the present embodiment, the background lighting means may be operated in various operating states. In a first operating state, it is provided that only the yellow light-emitting diodes 16, 18, 20, 22 are activated by the control device 25 and the remaining light-emitting diodes are switched off. In this operating state, the entire liquid crystal display screen 9 is backlit yellow.

In a second operating state, the driver is also able to adjust the background colors of the partial display areas of the liquid crystal display screen 9 associated with the individual part light guides 11-14. Provision is therefore made, in the case of the present embodiment, for the yellow light-emitting diodes 16 of the first part light guide 11 to be switched off, while the red light-emitting diodes 17 of the first part light guide 11 are switched on. It is also possible to switch on the green light-emitting diodes 19 of the second part light guide 12, rather than the yellow light-emitting diodes 18, as a result of which the portion of the liquid crystal display screen 9 that is associated with the second part light guide 12 is backlit green. The same accordingly applies to the third part light guide 13 and the fourth part light guide 14.

The interfaces coated with the thin, non-transparent layers 26-29, at which interfaces the part light guides 11-14 respectively make contact, prevent light injected into one of the part light guides from also being injected into one of the other part light guides.

In the case of the present embodiment, the heads-up display 5 may be operated in a third operating state. In the third operating state, only the yellow light-emitting diodes 16, 18, 20, 22 are switched on and the remaining light-emitting diodes are switched off. If the driver's attention is to be drawn, for example, to the backlit image content associated with the first part light guide 11, the control device 25 automatically switches the yellow light-emitting diodes 16 of the first part light guide 11 off and the red light-emitting diodes 17 of the first part light guide 11 on.

Owing to the interfaces coated with the thin, non-transparent layers 26-29, at which interfaces the part light guides 11-14 respectively make contact, the red light injected into the first part light guide 11 does not disturb the partial display areas which are associated with the remaining part light guides 12-14 and backlight the liquid crystal display screen 9 yellow.

Figure 5:
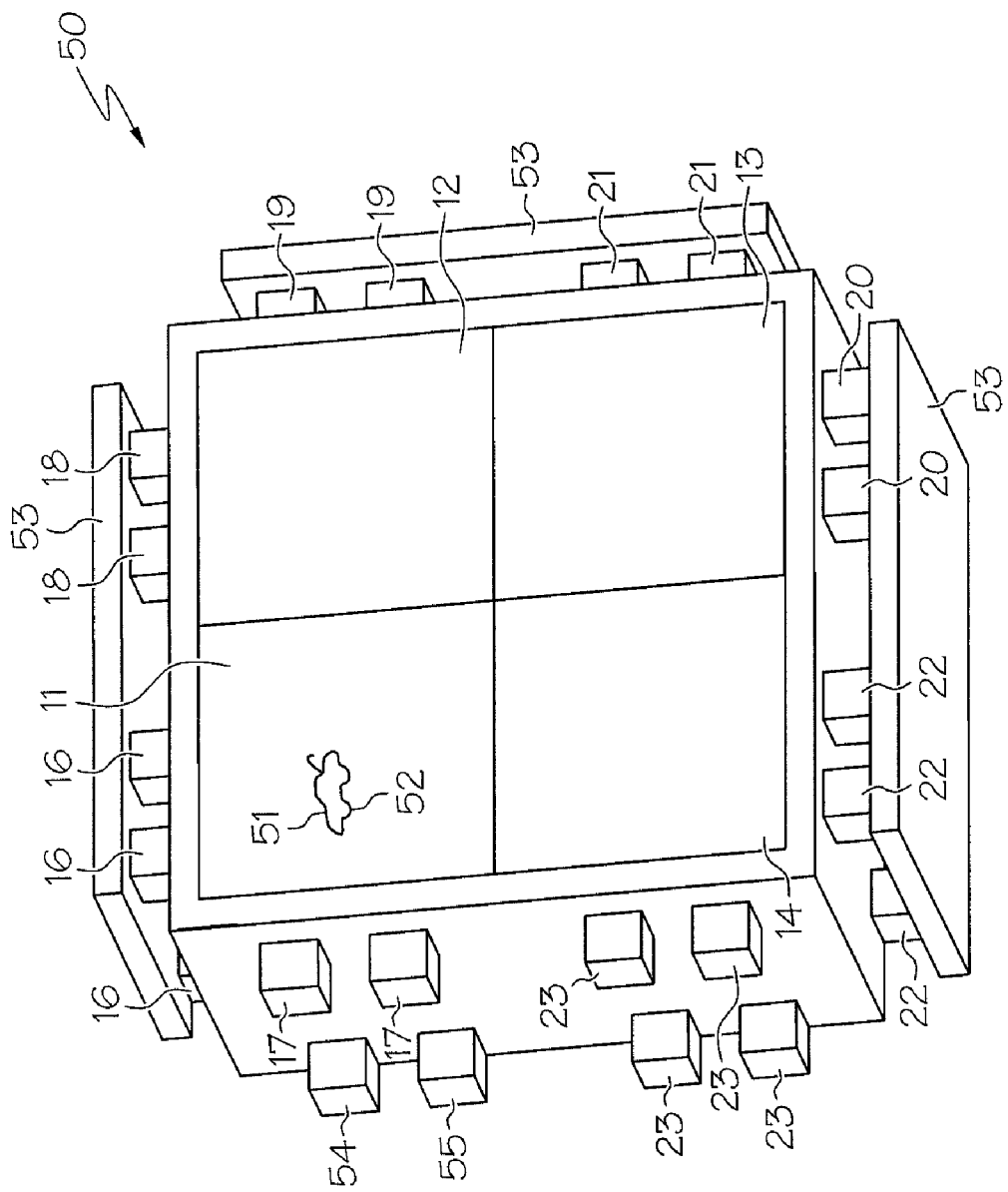
FIG. 5 is a further display device for the heads-up display of FIG. 2.

FIG. 5 shows a further display device 50 which may be used instead of the display device 8 shown in FIG. 2 to 4 for the heads-up display 5. Unless otherwise specified, components of the display device 50 shown in FIG. 5 which are identical in terms of construction and functioning to components of the display device 8 shown in FIG. 2 to 4 are provided with the same reference numerals.

The display device 50 illustrated in FIG. 5 differs substantially from the display device 8 shown in FIG. 2 to 5 in terms of its background lighting means. Said means comprises, in addition to the four part light guides 11-14, a fifth part light guide 51 which is inserted in the first part light guide 11 and, in the case of the present embodiment, is in the form of a vehicle having an open rear door. The interface between the fifth part light guide 51 and the first part light guide 11 is provided, in the case of the present embodiment, with a non-transparent layer 52 which isolates the fifth part light guide 51 from the first part light guide 11. The non-transparent layer 52 was attached to the fifth part light guide 51 by means of color printing.

The display device 50 comprises, in addition to the light-emitting diodes 16-23, which are connected to the control device 25 and disposed on printed circuit boards 53, a further yellow light-emitting diode 54 and red light-emitting diode 55. The two light-emitting diodes 54, 55 are provided to inject their light into the fifth part light guide 51 and are also connected to the control device 25. In the case of the present embodiment, the control device 25 is configured in such a way that it activates the yellow light-emitting diode 54 of the fifth part light guide 51 when the rear door 30 of the passenger car is locked. As a result, the fifth part light guide 51 backlights the liquid crystal display screen 9 yellow. If, on the other hand, the rear door 30 of the passenger car is not locked, the control device 25 activates the red light-emitting diode 55, so the fifth part light guide 51 backlights the liquid crystal display screen 9 red. A red-lit projected image of a vehicle having an opened rear door on a yellow background thus appears in the projection region 6 of the windscreen 2 when the first part light guide 11 backlights the liquid crystal display screen yellow. Owing to the non-transparent layer 52 of the fifth part light guide 51, the injected colors of the first and fifth part light guides 11, 51 do not disturb one another—and if they do, then they do so only slightly—as a result of which the projected image of the vehicle having an open rear door is relatively clearly defined.

Although the present invention has been described with reference to preferred embodiments, the invention is not restricted thereto, but rather may be modified in many ways. In particular, the selected colors of the yellow and red light-emitting diodes are intended merely as examples. In addition, the two light guides 5 and 6 may also be isolated from one another by other methods, for example by a light-reflecting layer or a thin film. The two light guides do not have to be rectangular either. In particular, it is possible for at least one of the two light guides to take the form of a symbol, so a symbol of a color differing from the color of the remainder of the background lighting means appears on the liquid crystal display screen. More than two light guides may also be used.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A heads-up display, comprising:
 a monochrome display device for generating an image; said monochrome display device comprising a display and a backlight for illuminating said display from its backside; and
 an optical device for generating a virtual image from said image of said display device; said backlight comprising:
 a first light source configured to selectively emit light of a first color or a second color,
 a second light source configured to selectively emit light of the first color and the second color, a third light source configured to selectively emit light of the first color or a third color, a fourth light source configured to selectively emit light of the first color or the third color, a first light guide coupled to said first light source, a second light guide coupled to said second light source, a third light guide coupled to said third light source, and a fourth light guide coupled to said fourth light source; said first, second, third, and fourth light guides being disposed in such close juxtaposition behind said display so that the first, second, third, and fourth light guides illuminate together the entire backside of said display and illuminate a first region of said display associated with said first light guide with said first color or said second color, a second region of said display associated with said second light guide with said first color or said second color, a third region of said display associated with said third light guide with said first color or said third color, and a fourth region of said display associated with said fourth light guide with said first color or said third color.

2. The heads-up display of claim 1, wherein said first, second, and third colors are adjustable.

3. The heads-up display of claim 1, wherein said first and second light guides are separated from one another by at least one of a non-transparent or light-reflecting layer.

4. The heads-up display of claim 3, wherein said layer is a thin film.

5. The heads-up display of claim 3, wherein said layer is applied by means of color printing.

6. The heads-up display of claim 1, wherein said display is a liquid-crystal display screen.

7. The heads-up display of claim 1, wherein at least one of the first and second light guides has the form of a symbol.

8. The display of claim 1, wherein said first color is yellow, said second color is red, and said third color is green.

9. The display of claim 8, wherein said optical device is configured to operate said first light source, said second light source, said third light source, and said fourth light source in a first state or a second state, said first state emitting yellow from said first light source, said second light source, said third light source, and said fourth light source, and said second state emitting red from said first and second light sources and green from said third and fourth light source.

10. A heads-up display, comprising:
a display device for generating an image, said display device comprising:
a first light guide,
a second light guide,
a third light guide,
a fourth light guide,
a first light source configured to selectively inject light of a first color or a second color into said first light guide,
a second light source configured to selectively inject light of said first color or said second color into said second light guide,
a third light source configured to selectively inject light of said first color or a third color into said third light guide, and
a fourth light source configured to selectively inject light of said first color or said third color into said fourth light guide; said first, second, third, and fourth light guides being disposed in such close juxtaposition that said first, second, third, and fourth light guides form substantially an area designed as a display area and being separated from one another by at least one of a non-transparent or a light-reflecting layer; and an optical device for generating a virtual image from said image of said display device.

11. The heads-up display of claim 10, wherein said layer is applied by means of color printing.

12. The heads up display of claim 10, wherein said layer is a thin film.

13. The heads-up display of claim 10, wherein said first, second, third, and fourth colors are adjustable.

14. The heads-up display of claim 10, wherein at least one of the first and second light guides has the form of a symbol.

15. The display of claim 10, wherein said first color is yellow, said second color is red, and said third color is green.

16. The display of claim 15, wherein said optical device is configured to operate said first light source, said second light source, said third light source, and said fourth light source in a first state or a second state, said first state emitting yellow from said first light source, said second light source, said third light source, and said fourth light source, and said second state emitting red from said first and second light sources and green from said third and fourth light source.

17. A method for operating a motor vehicle heads-up display comprising a display device coupled to a backlight device including a first light source selectively emitting yellow light or green light, a second light source selectively emitting yellow light or green light, a third light source selectively emitting yellow light or red light, and a fourth light source selectively emitting yellow light or red light for generating a virtual image from said display device, said method comprising the steps of:
operating said backlight device in a first state; and
operating said backlight device in a second state, wherein:
operating in said first state comprises emitting yellow light from said first, second, third, and fourth light sources, and
operating in said second state comprises emitting green light from said first and second light sources and emitting red light from said third and fourth light sources.

18. The method of claim 17, further comprising the step of operating said backlight device in a third state.

19. The method of claim 18, wherein operating in said third state comprises the steps of:
emitting yellow light from the second, third, and fourth light sources; and
emitting green light from the first light source.

20. The method of claim 18, wherein operating in said third state comprises the steps of:
emitting yellow light from the first, third, and fourth light sources; and
emitting green light from the second light source.

21. The method of claim 18, wherein operating in said third state comprises the steps of:
emitting yellow light from the first, second, and fourth light sources; and
emitting red light from the third light source.

22. The method of claim 18, wherein operating in said third state comprises the steps of:
emitting yellow light from the first, second, and third light sources; and
emitting red light from the fourth light source.

* * * * *